(12) United States Patent
Watanabe et al.

(10) Patent No.: US 8,729,482 B2
(45) Date of Patent: May 20, 2014

(54) RADIATION DETECTOR

(71) Applicants: Tokuyama Corporation, Yamaguchi (JP); National University Corporation Nagoya University, Aichi (JP); Tohoku University, Miyagi (JP)

(72) Inventors: Kenichi Watanabe, Aichi (JP); Yoshihiko Takahashi, Aichi (JP); Atsushi Yamazaki, Aichi (JP); Akira Uritani, Aichi (JP); Tetsuo Iguchi, Aichi (JP); Kentaro Fukuda, Yamaguchi (JP); Noriaki Kawaguchi, Yamaguchi (JP); Sumito Ishizu, Yamaguchi (JP); Akira Yoshikawa, Miyagi (JP); Takayuki Yanagida, Miyagi (JP)

(73) Assignees: Tokuyama Corporation, Shunan-shi, Yamaguchi (JP); National University Corporation Nagoya University, Nagoya-shi, Aichi (JP)

( * ) Notice: Subject to any disclaimer, the term of this patent is extended or adjusted under 35 U.S.C. 154(b) by 0 days.

(21) Appl. No.: 13/760,471

(22) Filed: Feb. 6, 2013

(65) Prior Publication Data

US 2013/0221227 A1 Aug. 29, 2013

(30) Foreign Application Priority Data

Feb. 24, 2012 (JP) ................................. 2012-038263

(51) Int. Cl.
*G01T 1/20* (2006.01)
*G01V 5/10* (2006.01)
(52) U.S. Cl.
USPC ....................... 250/366; 250/269.6
(58) Field of Classification Search
USPC .............................. 250/366, 269.6
See application file for complete search history.

(56) References Cited

U.S. PATENT DOCUMENTS

2004/0061047 A1  4/2004  Bolozdynya et al.
2007/0272874 A1  11/2007  Grodzins
(Continued)

FOREIGN PATENT DOCUMENTS

WO  2009/119378 A1  10/2009

OTHER PUBLICATIONS

Atsushi Yamazaki, et al; "Neutro-gamma discrimination based on pulse shape discrimination in a Ce:liCaAlF$_6$ scintillator", Nuclear Instruments and Methods in Physics Research A 652, pp. 435-438; Available online Feb. 24, 2011.

(Continued)

*Primary Examiner* — David Porta
*Assistant Examiner* — Kenneth J Malkowski
(74) *Attorney, Agent, or Firm* — Ladas & Parry LLP

(57) ABSTRACT

Provided is a radiation detector with improved n/γ discrimination and usable even under high counting rate conditions with a reduced load on a signal-processing system. The detector capable of distinguishing neutron and gamma-ray events includes: a scintillator; an optical filter; a first photodetector to which a first part of light emitted from the scintillator is introduced via the optical filter; and a second photodetector to which a second part of light emitted from the scintillator is introduced not via the optical filter, wherein, for a set of two wavelengths A and (A+B) nm, the scintillator emits at least a light of A nm and a light of (A+B) nm when irradiated by gamma-ray, and emits a light of A nm and does not emit a light of (A+B) nm when irradiated by neutrons; and the optical filter blocks the light of A nm and transmits the light of (A+B) nm.

7 Claims, 6 Drawing Sheets

(56) References Cited

U.S. PATENT DOCUMENTS

2010/0314550 A1 12/2010 Yoshikawa et al.
2013/0112885 A1* 5/2013 Takahashi et al. ............ 250/367

OTHER PUBLICATIONS

D.W. Lee, et al; "Pulse-shape analysis of $Cs_2 LiYCL_6$ : Ce scintillator for neutron and gamma-ray discrimination", Nuclear Instruments and Methods in Physics Research A 664, pp. 1-5; Available online Oct. 20, 2011.

Andrey Novoselov, et al; "Crystal Growth and Scintillating Properties of Pb-doped $LiCaAlF_6$ ", 2007 IEEE Nuclear Science Symposium Conference Record, 2007. NSS '07. IEEE, IEEE, PI, Oct. 1, 2007, pp. 2184-2187, XPO31206090, ISBN: 978-1-4244-0922-8; the whole document.

Malcolm J. Joyce, et al; "Real-Time, Digital Imaging of Fast Neutrons and rays with a single fast liquid scintillation detector", Nuclear Science Symposium and Medical Imaging Conference (NSS/MIC), 2011 IEEE, Oct. 23, 2011, pp. 602-606, XP032117296, DOI: 10.1109/NSSMIC.2011.6154120 ISBN: 978-1-4673-0118-3; the whole document.

European Search Report dated Aug. 30, 2013, Appln. 13 15 4440.

* cited by examiner

RADIATION DETECTOR

TECHNICAL FIELD

The present invention relates to a scintillation radiation detector having a scintillator. In specific, it relates to a novel radiation detector capable of discriminating between neutron events and gamma-ray events.

BACKGROUND ART

The radiation detector is an elemental technology that supports the technology utilizing radiation. With the recent development of the technology utilizing radiation, radiation detectors with higher performance are demanded. In the technology utilizing radiation, advancement in the technology utilizing neutrons is remarkable. Application of the technology utilizing neutrons is expanding in such fields as the academic research field including structural analysis by neutron diffraction, the field of non-destructive inspection, the security field including cargo inspection, and the medical field including boron neutron capture therapy; and accordingly, neutron detectors with higher performance are demanded.

An important characteristic demanded of the neutron detector is discrimination ability between neutrons and gamma rays (also referred to as "n/γ discrimination", hereinafter). Gamma rays not only exist in natural radiation, but also are generated when neutrons hit a component of a neutron detecting system or hit an object to be inspected. Therefore, if gamma rays are mistakenly detected as neutrons because of low n/γ discrimination, signals not reflecting the interaction between neutrons and the object to be inspected will be included, causing increase in the so-called background noise.

In general, a neutron capture reaction is utilized to detect neutrons since neutrons have strong tendency to pass through a material without performing any interactions in the material. For example, a helium-3 detector is known, which performs the detection by utilizing a proton and tritium generated by the neutron capture reaction between $^3$He and neutron. This detector is a proportional counter filled with $^3$He gas, having high detection efficiency and being excellent in n/γ discrimination. However, there is a drawback that the size of the detector is hard to reduce. Further, $^3$He is an expensive substance and is also limited in its amount.

Recently, a scintillation neutron detector having a neutron scintillator has been developed as an alternative to the helium-3 detector described above. The neutron scintillator is a substance that emits light by interaction with neutrons irradiated thereto. Combining the neutron scintillator and a photodetector such as a photomultiplier tube can form the scintillation neutron detector. As the neutron scintillator, a material containing a large amount of isotope that exhibits high efficiency in the neutron capture reaction, such as $^6$Li and $^{10}$B, is employed in order to improve the detection efficiency for neutrons (see Patent Document 1, for example).

The scintillation neutron detector having the neutron scintillator is advantageous in that it has high detection efficiency for neutrons and can be easily reduced in size. However, it has a drawback of being poor in n/γ discrimination since the neutron scintillator is sensitive to gamma rays as well.

Various attempts have been made in view of the above problems. In the scintillation neutron detector having the neutron scintillator, a photodetector detects light emitted from the neutron scintillator and outputs a pulse signal. There has been suggested a method of discriminating between neutrons and gamma rays by using a difference in the shape of the pulse signal between neutron incidents and gamma ray incidents (hereinafter the method being referred to as pulse shape discrimination) (see Non-Patent Documents 1 and 2). A detector adopting the pulse shape discrimination can be used as a radiation detector that can measure both neutrons and gamma rays with discrimination between them.

CITATION LIST

Patent Literature

Patent Document 1: WO 2009/119378

Non-Patent Literature

Non-Patent Document 1: A. Yamazaki, et al., "Neutron-gamma discrimination based on pulse shape discrimination in a Ce:LiCaAlF$_6$ scintillator", Nuclear Instruments and Methods in Physics Research A 652 (2011) pp. 435-438.
Non-Patent Document 2: D. W. Lee, et al., "Pulse-shape analysis of Cs$_2$LiYCl$_6$:Ce scintillator for neutron and gamma-ray discrimination", Nuclear Instruments and Methods in Physics Research A 664 (2012) pp. 1-5.

SUMMARY OF INVENTION

Solution to Problem

Although these conventional scintillation radiation detectors employing the pulse shape discrimination discriminate neutrons from gamma rays well, there is a disadvantage of causing a heavy load on a signal processing system for analyzing the shape of the pulse signal outputted from the photodetector. Especially in a case of employing a position sensitive radiation detector with a multi-element photodetector, it is necessary to analyze the pulse shape outputted from each element of the photodetector, and thus the detector cannot be used under a high counting rate (i.e. high number of incident neutrons and/or incident gamma rays per unit time).

The present invention has been made in order to solve the above problems, with an object to provide a scintillation radiation detector excellent in n/γ discrimination with a reduced load on a signal processing system, as compared to the conventional scintillation radiation detectors adopting the pulse shape discrimination.

Means for Solving the Problems

The inventors conducted various studies on a detector having a scintillator in order to improve its n/γ discrimination. As a result, they discovered that there is a difference in the wavelength of the light emitted from the scintillator, between incidence of neutrons to the scintilaltor and incidence of gamma rays to the scintillator.

Then, they found that it is possible to obtain a scintillation radiation detector with n/γ discrimination ability by configuring a scintillation radiation detector to be capable of distinguishing the difference in the wavelength, which has led to completion of the present invention.

In specific, the present invention provides a scintillation radiation detector capable of discriminating between neutron events and gamma-ray events, including: a scintillator; an optical filter; a photodetector to which a part of light emitted from the scintillator is introduced via the optical filter; and another photodetector to which another part of light emitted from the scintillator is introduced not via the optical filter, wherein, for a set of two wavelengths of A nm and (A+B) nm, the scintillator emits at least a light having the wavelength of A nm and a light having the wavelength of (A+B) nm when irradiated by gamma-ray, emits a light having the wavelength of A nm when irradiated by neutrons, and does not emit a light having the wavelength of (A+B) nm when irradiated by neutrons; and the optical filter blocks the light having the wavelength of A nm and transmits the light having the wavelength of (A+B) nm.

Effects of the Invention

According to the present invention, it is possible to provide a scintillation radiation detector excellent in n/γ discrimination with a reduced load on a signal processing system. Even when the scintillation radiation detector is configured to be a position sensitive scintillation radiation detector with a multi-element photodetector, it can be operated under high counting rate conditions and therefore can be favorably employed in such fields as the academic research field including structural analysis by neutron diffraction, the field of non-destructive inspection, the security field including cargo inspection, and the medical field including boron neutron capture therapy.

MODES FOR CARRYING OUT THE INVENTION

Figure 1:
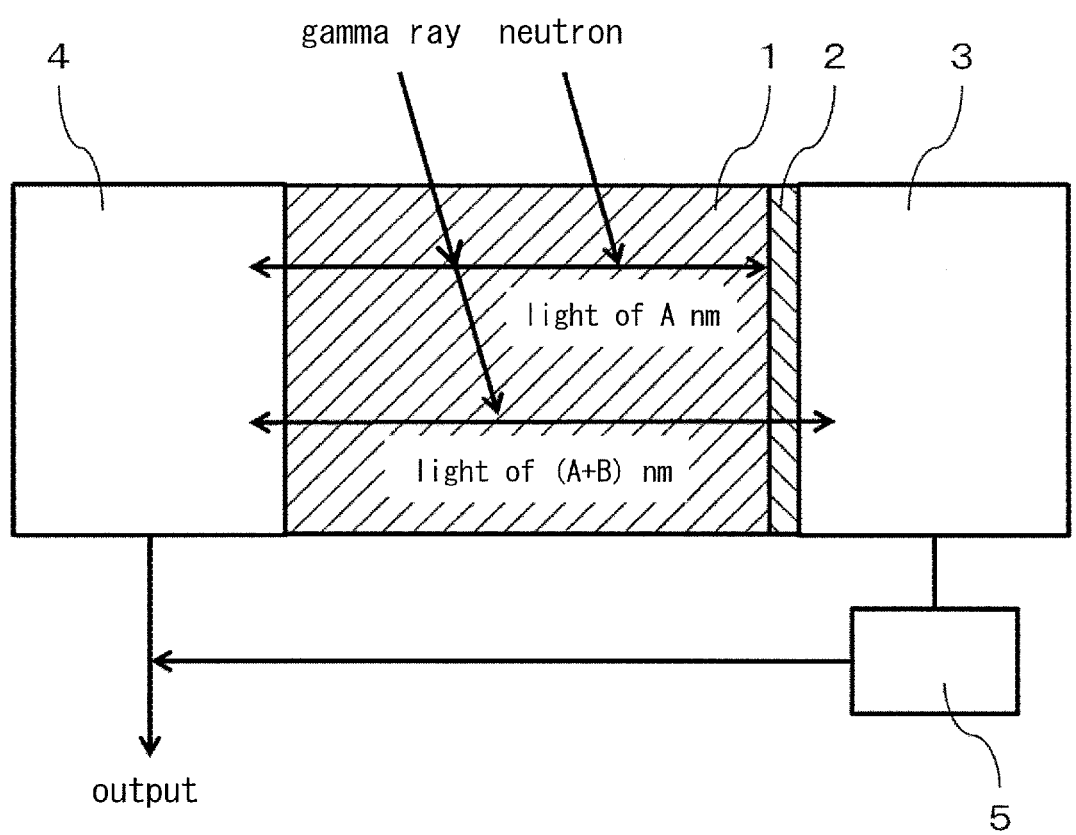
FIG. 1 is a schematic diagram of the scintillation radiation detector of the present invention.

The scintillation radiation detector of the present invention has a scintillator, and discriminates between neutron events and gamma-ray events based on the difference in the wavelength of the light emitted from the scintillator, between incidence of the neutrons to the scintillator and incidence of the gamma rays to the scintillator.

Hereinafter, the operation principle of the scintillation radiation detector of the present invention will be described in detail with reference to FIGS. 1 to 3.

In the present invention, for a set of two wavelengths of A nm and (A+B) nm, the scintillator (1) emits at least a light having the wavelength of A nm and a light having the wavelength of (A+B) nm when irradiated by gamma-ray, emits a light having the wavelength of A nm when irradiated by neutrons, and does not emit a light having the wavelength of (A+B) nm when irradiated by neutrons.

A part of light emitted from the scintillator is introduced to a photodetector (3) via an optical filter (2); and another part of light emitted from the scintillator is introduced not to the photodetector (3) but to another photodetector (4), not via the optical filter (2).

In the present invention, the optical filter (2) blocks the light having the wavelength of A nm and transmits the light having the wavelength of (A+B) nm. Thus, while the light of A nm emitted from the scintillator upon irradiation of neutrons reaches the photodetector (4), it does not reach the photodetector (3) because it is blocked by the optical filter (2). On the other hand, among the lights emitted from the scintillator upon irradiation of gamma rays, while the light having the wavelength of A nm behaves in the same way as in the case of the neutron irradiation, the light of (A+B) nm reaches the photodetector (4) and also reaches the photodetector (3) since it passes through the optical filter (2).

Hence, when the light having the wavelength of A nm enters the photodetector (4) and a signal is outputted from the photodetector (4), the case can be judged as the neutron event if no signal is outputted from the photodetector (3), and the case can be judged as the gamma-ray event if the light having the wavelength of (A+B) nm enters the photodetector (3) and a signal is outputted from the photodetector (3).

The scintillation radiation detector of the present invention preferably has a discriminator (5) for discriminating between neutrons and gamma rays as described above. The discriminator operates in synchronization with a signal from the photodetector (4) and judges existence of a signal from the photodetector (3) when the signal is outputted from the photodetector (4). Specific examples of the discriminator include an anticoincidence circuit and a gate circuit.

The scintillation radiation detector of the present invention having the above configuration exhibits special advantageous effects when it is arranged as a position sensitive scintillation radiation detector with a multi-element photodetector. That is, while a signal from an array of photodetection elements (6) of the photodetector is processed in a position processor (7) and thereby a position of radiation incidence is identified in the position sensitive scintillation radiation detector as shown in FIG. 2, it is not necessary to provide a discriminator for each photodetection element in the present invention. The present invention makes it possible to discriminate between neutrons and gamma rays with a single discriminator (5). Thus, the signal processing system can be significantly simplified. And also, the time necessary for signal processing can be shortened and therefore the detector can be used under high counting rate conditions.

Figure 3:
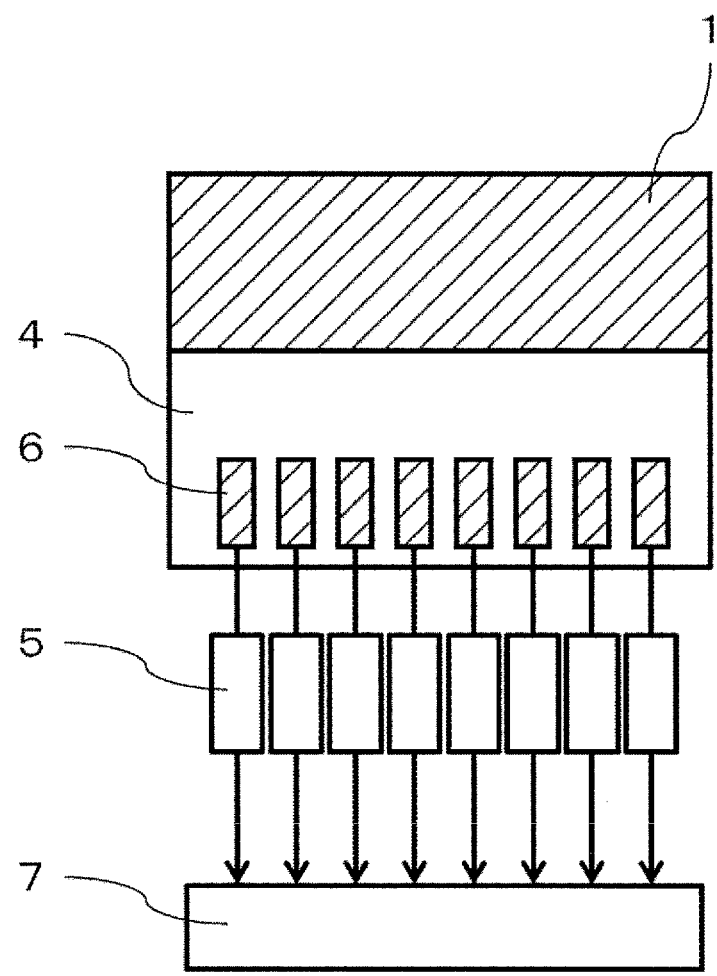
FIG. 3 is a schematic diagram of a conventional position sensitive scintillation radiation detector with the pulse shape discrimination.

By contrast, in a conventional position sensitive scintillation radiation detector adopting the pulse shape discrimination, a discriminator needs to be arranged for each element as shown in FIG. 3, thus causing complexity of the signal processing system and requiring a great amount of time for signal processing. Therefore, the detector cannot be used under high counting rate conditions.

In the present invention, although the wavelength A nm of the light emitted from the scintillator (1) upon irradiation of neutrons is not particularly limited, it is preferably 100 to 1000 nm in view of the light detection efficiency of the photodetector. And also, it is preferable to employ a scintillator which emits a light in a wavelength range that allows high detection efficiency of the photodetector used. Specifically, it is preferable to employ: a scintillator which emits a light having a wavelength of 100 to 200 nm when employing, as the photodetector, a photomultiplier having a photocathode made of Cs—I; a scintillator which emits a light having a wavelength of 100 to 300 nm when employing, as the photodetector, a photomultiplier having a photocathode made of Cs—Te; a scintillator which emits a light having a wavelength of 150 to 650 nm when employing, as the photodetector, a photomultiplier having a so-called bialkali photocathode made of Sb—Rb—Cs, Sb—K—Cs, or Sb—Na—K etc.; a scintillator which emits a light having a wavelength of 150 to 900 nm when employing, as the photodetector, a photomultiplier having a so-called multialkali photocathode made of Sb—Na—K—Cs etc.; or a scintillator which emits a light having a wavelength of 350 to 1000 nm when employing a Si photodiode.

Although the wavelength (A+B) nm of the light emitted by the scintillator (1) upon irradiation of gamma rays is not particularly limited, it is preferably 200 to 1100 nm in view of the light detection efficiency of the photodetector as above. Further, the difference between the wavelengths (A+B) nm and A nm is preferably large in order to improve accuracy of distinguishing neutron events and gamma-ray events using the optical filter (2). Namely, a scintillator with the numerical value B of no less than 50 is preferred, and a scintillator with the numerical value B of no less than 100 is especially preferred. As long as at least the light having the wavelength of (A+B) nm is included in the lights emitted from the scintillator (1) upon irradiation of gamma rays, it works in the present invention. Even if a light having a wavelength other than the (A+B) nm is also included in the lights emitted from the scintillator (1) upon irradiation of gamma rays, there will not be any problem in operation of the scintillation radiation detector of the present invention.

In the present invention, the scintillator (1) is not particularly limited as long as it emits lights having the wavelength described above. Known scintillator crystals, glass scintillators, ceramic scintillators, or organic scintillators may be employed.

In order to improve the neutron detection efficiency, the scintillator preferably contains an isotope which exhibits high efficiency in the neutron capture reaction, such as $^6$Li and $^{10}$B.

Among the scintillators described above, preferred are: a colquiriite-type crystal of a metal salt represented by the formula (1):

$$LiM^1M^2X_6 \qquad (1)$$

(wherein $M^1$ is one or more alkali earth metal element selected from the group consisting of Mg, Ca, Sr, and Ba; $M^2$ is one or more metal element selected from the group consisting of Al, Ga, and Sc; and X is one or more halogen element selected from the group consisting of F, Cl, Br, and I.) in which one or more lanthanoid element is further contained; and a colquiriite-type crystal having a composition in which a metal halide with the composition represented by the chemical formula (1) further contains one or more lanthanoid element and one or more alkali metal element. It is because they emit the light having the wavelength described above, emit large amount of light, and have short fluorescent lifetime thus being suitable for the high count rate operation.

Specific examples of such colquiriite-type crystals include: Ce:LiCaAlF$_6$; Ce,Na:LiCaAlF$_6$; Ce:LiSrAlF$_6$; Ce,Na:LiSrAlF$_6$; Eu:LiCaAlF$_6$; Eu,Na:LiCaAlF$_6$; Eu:LiSrAlF$_6$; and Eu,Na:LiSrAlF$_6$.

In the present invention, the optical filter (2) is not particularly limited as long as it substantially attenuates the light having the wavelength of A nm and substantially transmits the light having the wavelength of (A+B) nm, among the lights emitted from the scintillator (1) and coming to the photodetector (3). In the present invention, "blocking the light having the wavelength of A nm" does not require the light to be blocked completely (100%), but it is satisfactory as long as the light is blocked to the extent that the advantageous effects of the present invention can be attained. In specific, the optical filter preferably transmits no more than 20% of the light having the wavelength of A nm, and especially preferably transmits no more than 10% of the light having the wavelength of A nm, in order to improve precision in discriminating between neutrons and gamma rays. Likewise, to "transmit the light having the wavelength of (A+B) nm" does not mean to transmit 100% of the light. The optical filter preferably transmits no less than 50% of the light having the wavelength of (A+B) nm, and especially preferably transmits no less than 70% of the light having the wavelength of (A+B) nm.

In general, the wavelength of the light emitted by the scintillator upon absorption of neutrons includes the wavelength of A nm and ranges to some extent. Therefore, it is preferable for the optical filter (2) to block the light in the wavelength range.

In the present invention, the optical filter (2) may transmit or block a light having a wavelength other than the above explained wavelengths of lights emitted by the scintillator (1) upon absorption of neutrons or gamma rays.

Favorable examples of the optical filter (2) described above include those made of a transparent base material such as glass containing a material which absorbs the light having the wavelength of A nm, or those made of a transparent base material such as glass whose surface is provided with a film which absorbs or reflects the light having the wavelength of A nm. Examples of commercially available optical filters that can be employed in the present invention include: long pass filters such as L37, L42, Y48, and O54 manufactured by HOYA CORPORATION, and N-WG320 manufactured by SCHOTT AG; band pass filters such as U330, U340, and U360 manufactured by HOYA CORPORATION; and dichroic mirrors such as DIM-50S-BLE, DIM-50S-GRE, DIM-50S-RFD manufactured by SIGMA KOKI CO., LTD.

In the present invention, the photodetectors (3) and (4) are not particularly limited, and known photodetectors may be employed in accordance with the wavelength of the light emitted from the scintillator (1). Specific examples of the photodetector that can be employed in the present invention include: a photomultiplier having a photocathode made of Cs—I, when the wavelength of the light emitted from the scintillator (1) is 100 to 200 nm; a photomultiplier having a photocathode made of Cs—Te, when the wavelength of the light emitted from the scintillator (1) is 100 to 300 nm; a photomultiplier having a so-called bialkali photocathode made of Sb—Rb—Cs, Sb—K—Cs, or Sb—Na—K etc., when the wavelength of the light emitted from the scintillator (1) is 150 to 650 nm; a photomultiplier having a so-called multialkali photocathode made of Sb—Na—K—Cs etc., when the wavelength of the light emitted from the scintillator (1) is 150 to 900 nm; and a Si photodiode, when the wavelength of the light emitted from the scintillator (1) is 350 to 1100 nm.

Further, in the case of using the scintillation radiation detector of the present invention as a position sensitive scintillation radiation detector with a multi-element detector, the photodetector (4) may be configured to have multiple elements. Examples of the multi-element photodetector (4) that can be favorably employed include: a metal channel dynode-multianode photomultiplier; a metal channel dynode-cross plate anode photomultiplier; a grid dynode-cross wire anode photomultiplier; and a microchannel plate-multianode photomultiplier.

EXAMPLES

Example of the present invention will be given hereinafter to describe the present invention in more detail; however, the present invention is not limited to Example. Further, the combinations of the features given in Example are not necessarily requisite for the solution to the problems presented by the present invention.

Example 1

Figure 2:
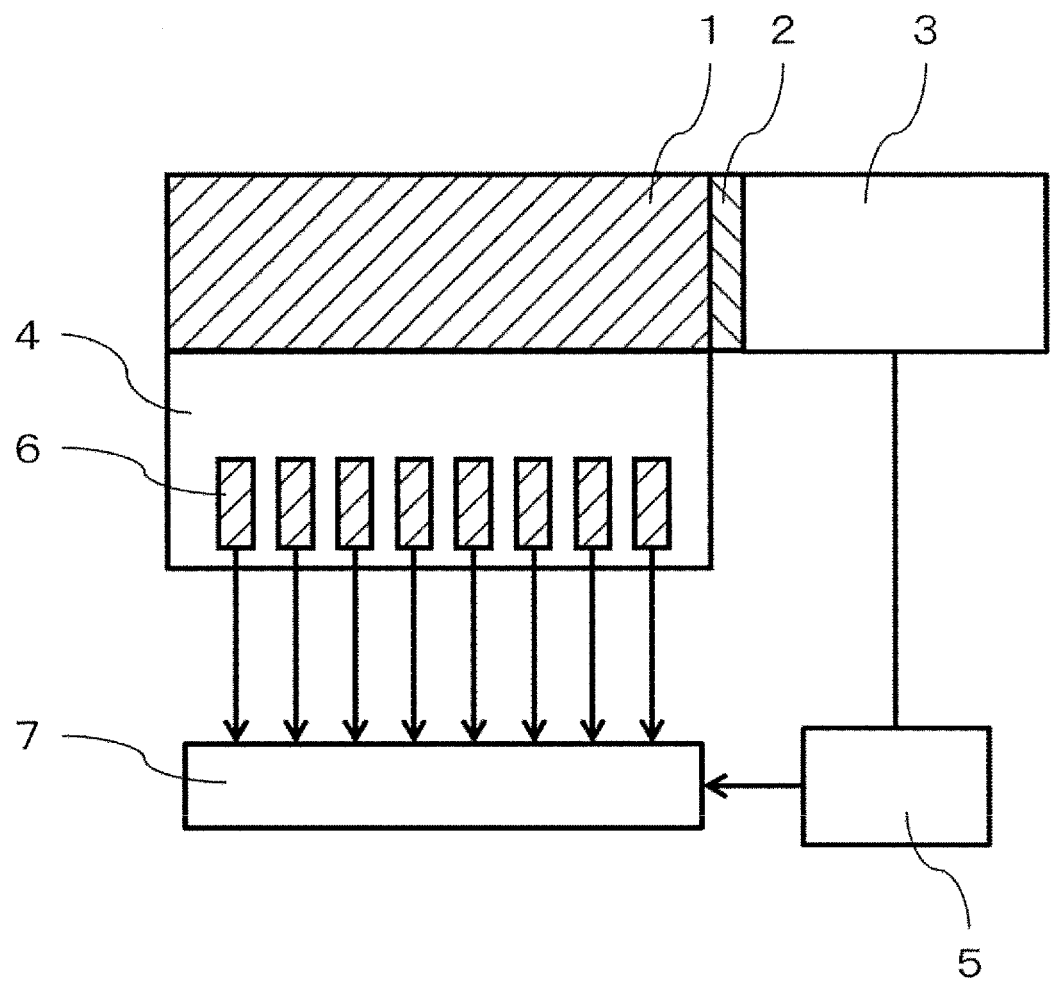
FIG. 2 is a schematic diagram of a position sensitive scintillation radiation detector of the scintillation radiation detector of the present invention.

A scintillation radiation detector configured as shown in FIG. 1 was made.

In the present Example, a Ce:LiCaAlF$_6$ single crystal was used as the scintillator (1). The scintillator emits a light having a wavelength of 290 nm when irradiated by neutrons. The wavelength of the light emitted by the scintillator ranges from 280 nm to 330 nm. On the other hand, when irradiated by gamma rays, the scintillator not only emits the light having the same wavelength of 290 nm (in the wavelength range of 280 nm to 330 nm) as in the irradiation by neutrons, but also emits a light in a wavelength range of 390 nm or longer.

In addition, L-37 manufactured by HOYA CORPORATION was used as the optical filter (2). The optical filter transmits no more than 5% of the light in the wavelength range of 280 to 330 nm, and transmits no less than 70% of the light in the wavelength range of 390 nm or longer.

Photomultipliers having a bialkali photocathode (R7600U manufactured by Hamamatsu Photonics K.K.) were used as the photodetector (3) and the photodetector (4). A power source (not shown in the FIG. 1) was connected to the photodetectors (3) and (4), and a high voltage of 600 V was applied.

The following were optically adhered to each other by an optical grease, respectively: the scintillator (1) and the optical filter (2); the optical filter (2) and the photodetector (3); and the scintillator (1) and the photodetector (4).

First, an oscilloscope was connected to the photodetector (3) and the photodetector (4), to see output from the photodetectors upon irradiation of neutrons and gamma rays.

After the scintillation radiation detector was covered with a light-shielding black sheet, neutrons from Cf-252 having a radioactivity of about 1 MBq were irradiated via moderator of 40 mm-thick polyethylene block, and output signals from the photodetector (3) and the photodetector (4) were observed using the oscilloscope. Gamma rays from Co-60 having a radioactivity of about 1 MBq were irradiated instead of neutrons, and output signals from the photodetectors were observed using the oscilloscope.

Figure 4:
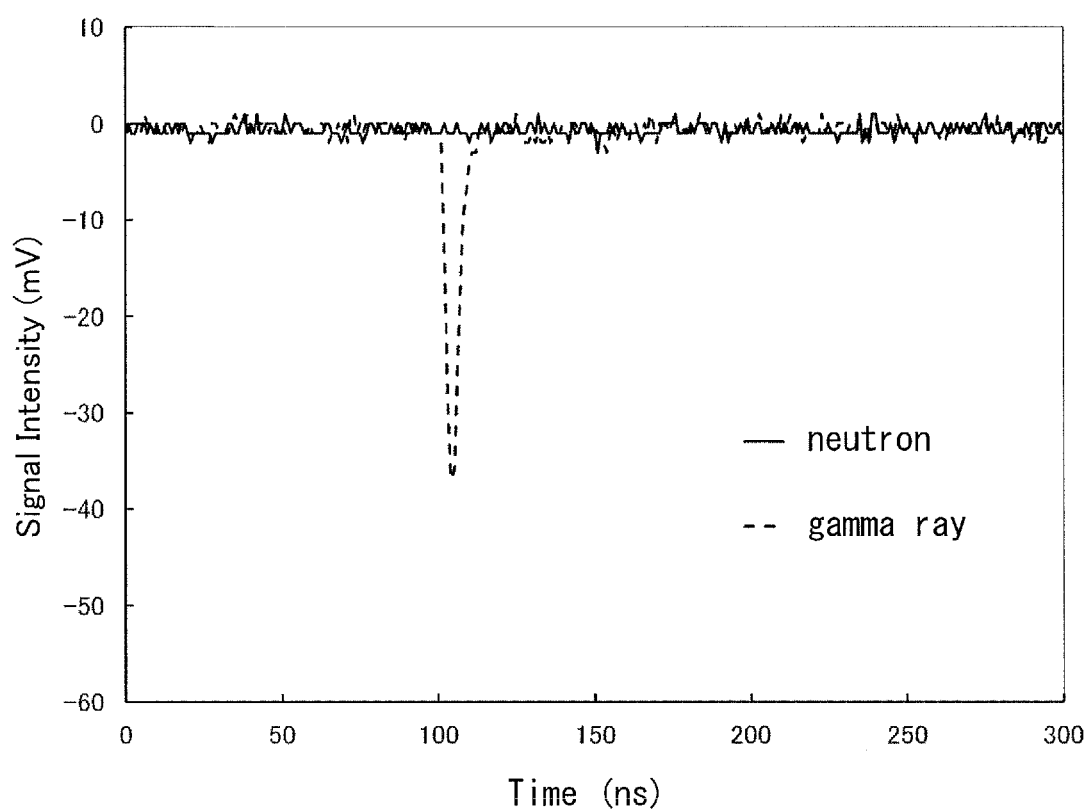
FIG. 4 is a view showing a signal from a photodetector (3) obtained in Example 1.
Figure 5:
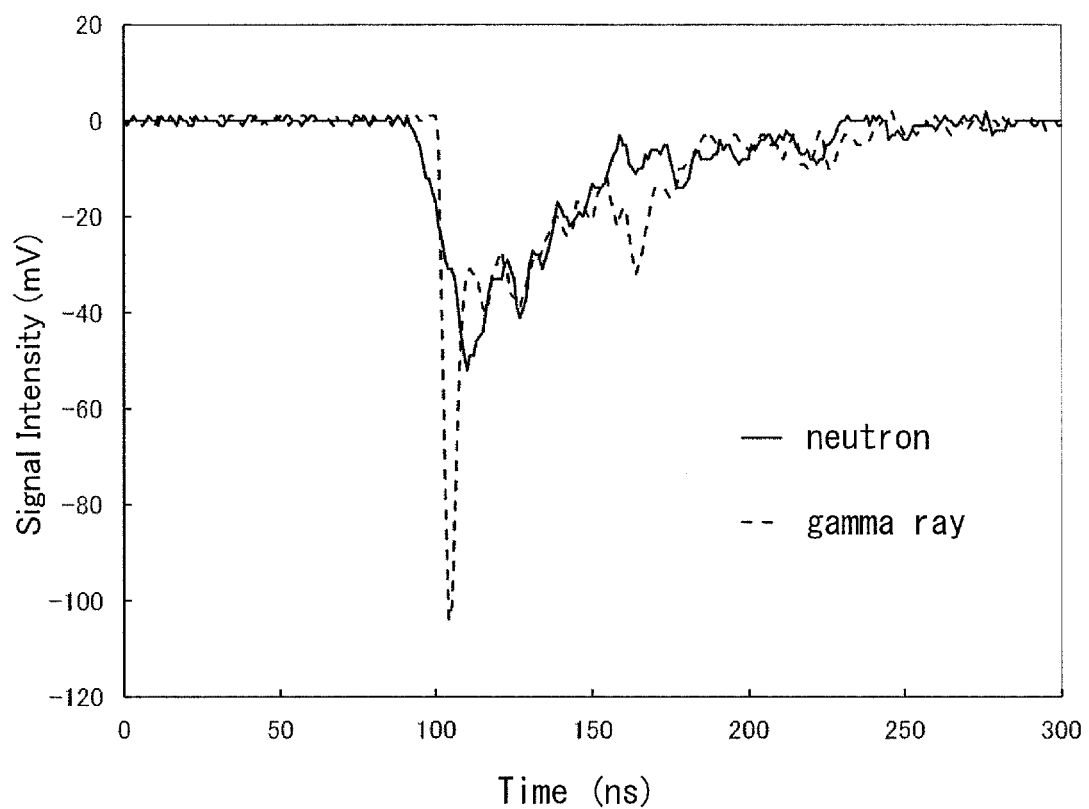
FIG. 5 is a view showing a signal from a photodetector (4) obtained in Example 1.

The signals obtained from the photodetector (3) and the photodetector (4) are shown in FIGS. 4 and 5, respectively.

It can be seen from FIG. 4 that: when the neutrons were irradiated, no signals were outputted from the photodetector (3); and only when the gamma rays were irradiated, a signal was outputted from the photodetector (3).

In addition, it can be understood from FIG. 5 that a signal was outputted from the photodetector (4) both on neutron irradiation and on gamma-ray irradiation.

Next, a discriminator (5) for judging existence of signal output for each event was provided to the photodetector (3); and the output from the photodetector (4) was connected to a multichannel analyzer via a preamplifier and a shaping amplifier. Herein, an anticoincidence circuit was used as the discriminator.

After the scintillation radiation detector was covered with a light-shielding black sheet, neutrons and gamma rays were irradiated simultaneously, and the signal inputted to the multichannel analyzer was analyzed to form a pulse height distribution spectrum. In the pulse height distribution spectrum, the pulse height value is given in the horizontal axis, and the frequency of the event of each pulse height value range is given in the vertical axis.

Figure 6:
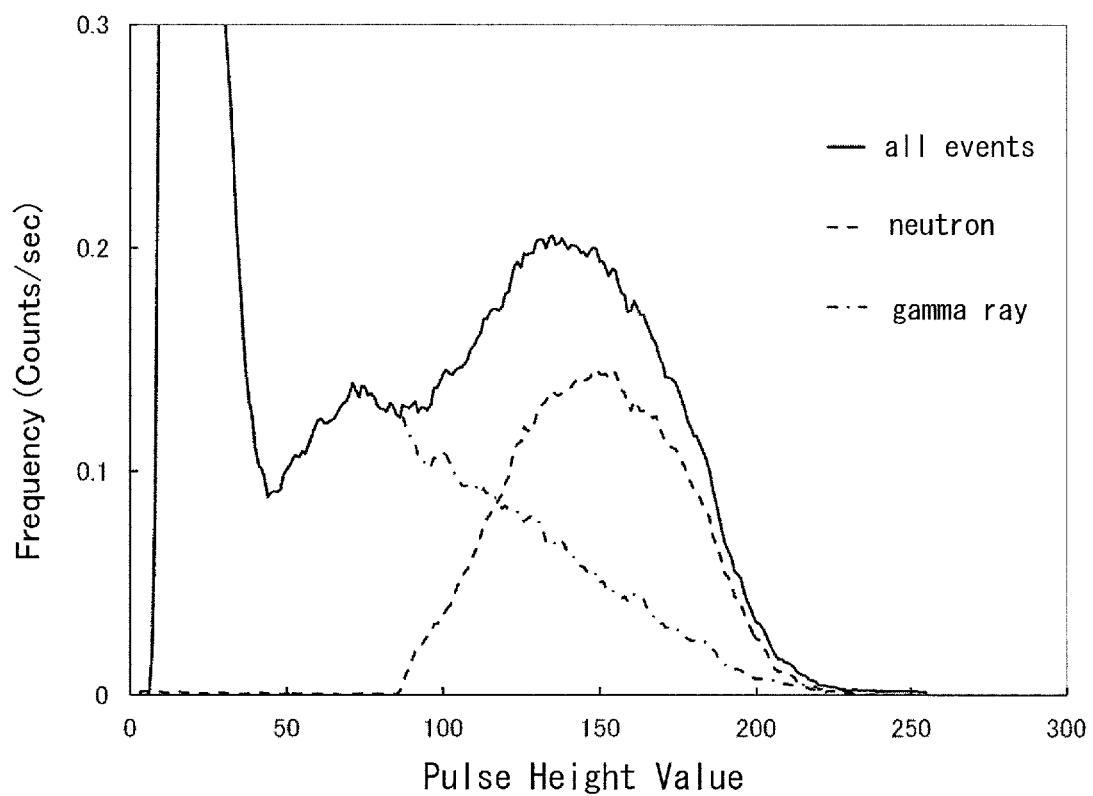
FIG. 6 is a pulse height distribution spectrum obtained in Example 1.

Pulse height distribution spectra obtained are shown in FIG. 6. The solid line in FIG. 6 represents a pulse height distribution spectrum formed with respect to all events without the discriminator (5) connected to the photodetector (3). The dotted line and the dot-dash line in FIG. 6 represent pulse height distribution spectra formed with respect to neutron events and gamma-ray events, respectively, which were obtained by extracting neutron events and gamma-ray events respectively using the discriminator (5) connected to the photodetector (3). It can be understood from the results shown in FIG. 6 that the scintillation radiation detector of the present invention can measure both neutrons and gamma rays with discrimination between them.

DESCRIPTION OF THE REFERENCE NUMERALS 1 scintillator
2 optical filter
3 photodetector
4 photodetector
5 discriminator
6 array of photodetection elements
7 position processor

The invention claimed is:

1. A scintillation radiation detector capable of discriminating between neutron events and gamma-ray events, comprising:
    a scintillator;
    an optical filter;
    a first photodetector to which a first part of light emitted from the scintillator is introduced via the optical filter; and
    a second photodetector to which a second part of light emitted from the scintillator is introduced not via the optical filter,
    wherein, for a set of two wavelengths of A nm and (A+B) nm,
    the scintillator emits at least a light having the wavelength of A nm and a light having the wavelength of (A+B) nm when irradiated by gamma-ray, emits a light having the wavelength of A nm when irradiated by neutrons, and does not emit a light having the wavelength of (A+B) nm when irradiated by neutrons; and
    the optical filter blocks the light having the wavelength of A nm and transmits the light having the wavelength of (A+B) nm.

2. The radiation detector according to claim 1, wherein said B is no less than 50.

3. The radiation detector according to claim 1, wherein the optical filter transmits no more than 20% of the light having the wavelength of A nm, and transmits no less than 50% of the light having the wavelength of (A+B) nm.

4. The radiation detector according to claim 1, wherein the scintillator comprises a colquiriite-type crystal of a metal salt represented by the formula (I):

$$\text{LiM}^1\text{M}^2\text{X}^6 \qquad (1)$$

[In the formula (1), M$^1$ is one or more alkali earth metal element selected from a group consisting of Mg, Ca, Sr, and Ba; M$^2$ is one or more metal element selected from a group consisting of Al, Ga, and Sc; and X is one or more halogen element selected from a group consisting of F, Cl, Br, and I.] in which at least one lanthanoid element is further contained or at least one lanthanoid element and at least one alkali metal element are further contained.

5. The radiation detector according to claim 1, wherein said second photodetector is a multi-element photodetector having an array of photodetection elements.

6. The radiation detector according to claim 5, further comprising:
    a position processor for processing signals from the array of photodetection elements.

7. The radiation detector according to claim 6, further comprising:
   a discriminator for judging existence of a signal from the first photodetector, wherein said discriminator is connected with the first photodetector and the position processor.

* * * * *